United States Patent
Watanabe et al.

(10) Patent No.: US 7,817,223 B2
(45) Date of Patent: Oct. 19, 2010

(54) LIQUID CRYSTAL DISPLAY DEVICE

(75) Inventors: Sakae Watanabe, Mutsuzawa (JP); Hiroshi Kurihara, Mobara (JP); Seiichi Nishiyama, Mobara (JP)

(73) Assignees: Hitachi Displays, Ltd., Chiba-Ken (JP); Hitachi Display Devices, Ltd., Chiba-Ken (JP)

(*) Notice: Subject to any disclaimer, the term of this patent is extended or adjusted under 35 U.S.C. 154(b) by 483 days.

(21) Appl. No.: 11/924,641

(22) Filed: Oct. 26, 2007

(65) Prior Publication Data

US 2008/0143924 A1 Jun. 19, 2008

(30) Foreign Application Priority Data

Oct. 27, 2006 (JP) .............................. 2006-291966

(51) Int. Cl.
   G02F 1/13357 (2006.01)
   G09F 13/04 (2006.01)
(52) U.S. Cl. .................... 349/70; 362/97.2; 362/217.09
(58) Field of Classification Search .................. 349/70; 362/97.2, 217.09, 225, 260, 614, 631; 345/102
See application file for complete search history.

(56) References Cited

U.S. PATENT DOCUMENTS 7,540,649 B2 * 6/2009 Satoh et al. ................. 362/630

| | | | |
|---|---|---|---|
| 2005/0128771 A1 | 6/2005 | Tanaka et al. | |
| 2005/0146653 A1 | 7/2005 | Baba et al. | |
| 2006/0120109 A1 | 6/2006 | Inoue et al. | |

FOREIGN PATENT DOCUMENTS

| JP | 2005-150056 | 6/2005 |
|---|---|---|
| JP | 2005-195778 | 7/2005 |
| JP | 2006-156413 | 6/2006 |

* cited by examiner

*Primary Examiner*—Dung T Nguyen
*Assistant Examiner*—Tai Duong
(74) *Attorney, Agent, or Firm*—Antonelli, Terry, Stout & Kraus, LLP.

(57) ABSTRACT

The present invention provides a display device of high brightness which can eliminate brightness irregularities on a display surface while preventing the degradation of display quality attributed to an undesired electric field generated at the time of performing inverter driving of the cold cathode fluorescent lamps of a backlight. In a liquid crystal display device, a plurality of cold cathode fluorescent lamps of a backlight unit is arranged along a short axis of the display device. The cold cathode fluorescent lamp has a high-voltage electrode thereof connected to an inverter circuit and a ground electrode thereof connected to a ground. Further, the plurality of cold cathode fluorescent lamps arranged along the short axis have electrodes thereof arranged alternately between the high-voltage electrode and the ground electrode.

3 Claims, 9 Drawing Sheets

LIQUID CRYSTAL DISPLAY DEVICE

CROSS-REFERENCE TO RELATED APPLICATION

The present application claims priority from Japanese application JP 2006-291966 filed on Oct. 27, 2006, the content of which is hereby incorporated by reference into this application

BACKGROUND OF THE INVENTION

1. Field of the Invention

The present invention relates to a display device, and more particularly to a liquid crystal display device having a backlight unit which arranges a plurality of cold cathode fluorescent lamps on a back surface of a liquid crystal panel.

2. Description of the Related Art

A liquid crystal display device is thin and light-weighted compared to a cathode-ray-tube-type display device and hence, the liquid crystal display device is used as a display device for various devices. Particularly, the liquid crystal display device can display color images and hence, the liquid crystal display device is used as a display device of a television receiver set, a personal computer or the like.

The liquid crystal display device is not a self-luminance display device and hence, the liquid crystal display device requires a backlight. The liquid crystal display device displays images by controlling light from the backlight using a liquid crystal display panel.

For example, an active-matrix-type liquid crystal panel has pixel electrodes connected to thin film transistors on one substrate and has color filters of red, green and blue on another substrate. Liquid crystal is sandwiched between these substrates.

Further, a polarizer is arranged on a backlight side of the liquid crystal panel so as to select components of light incident on the liquid crystal panel from the backlight. On the other hand, a polarizer is also arranged on a viewer's side of the liquid crystal panel so as to allow the selective transmission of light necessary for image display.

In this manner, the liquid crystal display device forms images by controlling light transmission quantities of the respective colors based on data inputted to thin film transistors.

In general, as a backlight unit used for the liquid crystal display device, there has been known a direct backlight unit which arranges cold cathode fluorescent lamps on a back surface of (directly below) a liquid crystal panel, a side-edge-type (light-guide-plate type) backlight unit which arranges light sources (cold cathode fluorescent lamps, LEDs or the like) on an end surface of a light guide plate or the like.

The side-edge-type backlight can decrease a thickness of the backlight unit. However, the side-edge-type backlight arranges the light sources on an edge portion of the light guide plate and hence, a large number of light sources can not be arranged on the edge portion of the light guide plate whereby it is difficult to increase the brightness of the backlight.

On the other hand, the direct backlight can increase the brightness thereof by increasing the number of cathode tubes which are arranged on the back surface of (directly below) a liquid crystal panel. However, when the number of cold cathode fluorescent lamps is increased, the power consumption is increased. There has been proposed a technique which adopts inverters in power sources of cold cathode fluorescent lamps for suppressing the increase of the power consumption.

Figure 14:
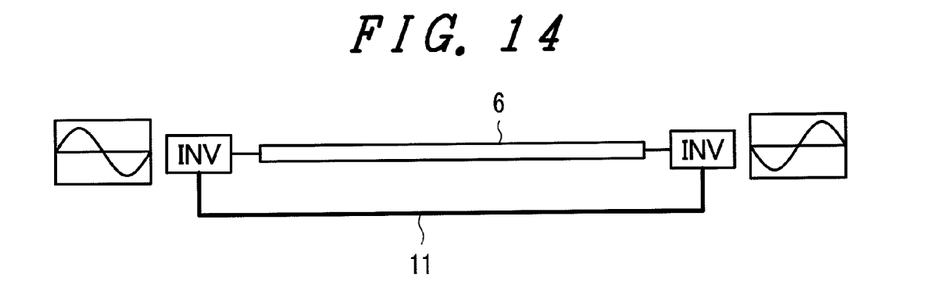
FIG. 14 is a conceptual view showing a conventional backlight system.

Patent document 1 (JP-A-2006-156413) describes a technique which applies an AC voltage to a cathode tube from both sides. When the AC voltage is applied to one cold cathode fluorescent lamp from both sides as shown in FIG. 14, two inverter circuits are necessary for one cathode tube. Further, in the technique disclosed in patent document 1, waveforms of outputs from two inverter circuits which are connected to one cold cathode fluorescent lamp have phases opposite to each other and hence, it is necessary to accurately synchronize two inverter circuits. When two inverter circuits are not accurately synchronized, a light emitting efficiency is dropped and hence, luminance spots are liable to be easily generated. Further, when a high-frequency voltage is applied to the cold cathode fluorescent lamp from both sides, a position which constitutes a ground potential becomes unstable thus making a current control difficult. Further, patent document 1 discloses a technique to make outputs of secondary windings of two inverter transformers have phases opposite to each other for suppressing noises generated from the inverter circuits.

Patent document 2 (JP-A-2005-150056) and patent document 3 (JP-A-2005-195778) disclose methods for reducing luminance spots on a backlight.

Patent document 2 discloses a technique which makes a distance between a cold cathode fluorescent lamp which is positioned at a center portion of a display screen and a liquid crystal panel longer than a distance between cold cathode fluorescent lamps which are positioned at upper and lower end portions of the screen and the liquid crystal panel. Due to such a constitution, the technique disclosed in patent document 2 suppresses brightness irregularities at the center portion of the display screen.

Patent document 3 discloses a technique which makes a distance between an end portion of a cold cathode fluorescent lamp on a side to which a high voltage is applied and a chassis larger than a distance between an end portion of the cold cathode fluorescent lamp on a side to which a low voltage is applied and the chassis. Due to such a constitution, patent document 3 can reduce a parasitic capacitance between the high voltage side of the cold cathode fluorescent lamp thus reducing an electric current leaked via the parasitic capacitance.

SUMMARY OF THE INVENTION

Figure 15:
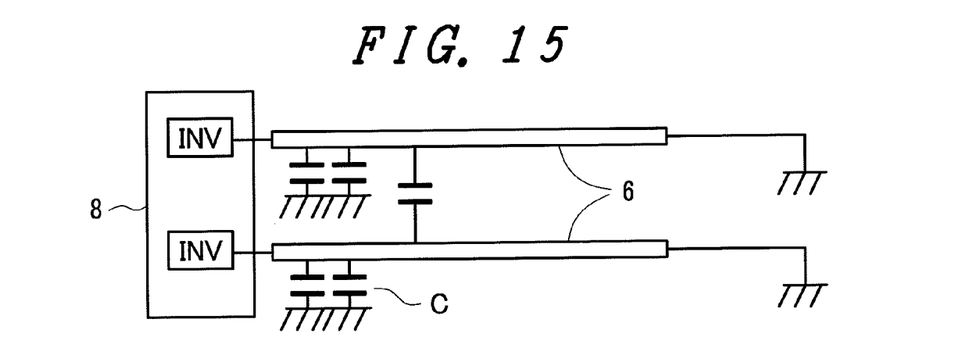
FIG. 15 is a conceptual view showing the conventional backlight system.

FIG. 15 is a conceptual view showing a conventional backlight system. A backlight of a liquid crystal display device includes a plurality of cathode tubes. The plurality of cold cathode fluorescent lamps is arranged in parallel, wherein the respective one ends of the cold cathode fluorescent lamps on the same side are connected to high-frequency power sources (hereinafter, referred to as inverters) INV, and the respective other ends of the cold cathode fluorescent lamps are grounded.

Due to such a constitution, parasitic capacitances C are generated between the respective cold cathode fluorescent lamps and a backlight frame. Since the parasitic capacitances (capacitors) are generated in parallel and hence, the capacitance of the capacitors is increased. That is, the capacitances which are formed between the respective cold cathode fluorescent lamps and the backlight frame can be considered as the capacitance which has one large capacitance.

Further, an induced voltage of high voltage is stored in the capacitance when a light source is turned on thus generating an undesired electric field between the cold cathode fluorescent lamps. When the induced voltage stored in the capacitance is discharged, thin film transistors of a liquid crystal panel are driven and hence, a desired image can not be obtained.

On the other hand, the liquid crystal display device uses only a portion of light emitted from the backlight when the image is displayed thereon. Accordingly, to increase the brightness of the displayed image, it is necessary to increase the brightness of the backlight. To increase the brightness of the backlight, the number of light sources may be increased or an optical flux quantity of the backlight may be increased. However, the increase of the number of cold cathode fluorescent lamps increases the capacitance generated between the respective cold cathode fluorescent lamps and the backlight frame.

Further, the increase of the number of cold cathode fluorescent lamps narrows a distance between the cold cathode fluorescent lamps. When the distance between the cold cathode fluorescent lamps is narrow, with the generation of displacement of phases of high-frequency voltages applied to the neighboring cold cathode fluorescent lamps, a capacitance is formed between the cold cathode fluorescent lamps. The formation of the capacitance brings about luminance spots of the backlight.

Further, as a cold cathode fluorescent lamp used in a backlight unit, there has been known a U-shaped tube which is formed by bending a cold cathode fluorescent lamp in a U shape. Since the U-shaped pipe is formed by bending the cold cathode fluorescent lamp, the restriction is imposed on the density of arrangement of the cold cathode fluorescent lamps. Further, gas (mercury) is liable to be stored in a bent portion thus giving rise to a drawback that a lifespan of the cold cathode fluorescent lamp becomes short.

The liquid crystal display device of the invention includes a liquid crystal panel which is constituted of a first substrate having thin film transistors, a second substrate having color filters and liquid crystal sandwiched between the first substrate and the second substrate, and a backlight unit which supplies light to the liquid crystal panel. The backlight unit includes a plurality of cold cathode fluorescent lamps which extends from the first side portion toward the second side portion (extending in the first direction), and the plurality of cold cathode fluorescent lamps are constituted of first cold cathode fluorescent lamps and second cold cathode fluorescent lamps.

The first cold cathode fluorescent lamps and the second cold cathode fluorescent lamps are alternately arranged in the second direction which intersects the first direction. An AC voltage is applied to an electrode formed on the first side portion of the first cold cathode fluorescent lamp, and a ground voltage is applied to an electrode formed on the second side portion of the first cold cathode fluorescent lamp. A ground voltage is applied to an electrode formed on the first side portion of the second cold cathode fluorescent lamp, and an AC voltage having the same phase as the AC voltage applied to the first cold cathode fluorescent lamp is applied to an electrode formed on the second side portion of the second cold cathode fluorescent lamp.

To explain another constitution of the invention, it is as follows. The backlight unit alternately arranges the first cold cathode fluorescent lamp and the second cold cathode fluorescent lamp. An AC voltage is applied to the electrode formed on the first side portion of the first cold cathode fluorescent lamp, and the electrode formed on the second side portion of the first cold cathode fluorescent lamp is connected to a ground. On the other hand, an AC voltage is applied to the electrode formed on the second side portion of the second cold cathode fluorescent lamp, and the electrode formed on the first side portion of the second cold cathode fluorescent lamp is connected to a ground. AC voltages having phases opposite to each other are respectively applied to two neighboring first cold cathode fluorescent lamps, and AC voltages having phases opposite to each other are respectively applied to two neighboring second cold cathode fluorescent lamps.

To explain another constitution of the invention, it is as follows. The first cold cathode fluorescent lamp connects an electrode formed on a first side portion thereof to an inverter circuit on a first printed circuit board and connects an electrode formed on a second side portion thereof to a ground. The second cold cathode fluorescent lamp connects an electrode formed on a second side portion thereof to an inverter circuit formed on a second printed circuit board thereof and connects an electrode formed on a first side portion thereof to a ground. The inverter circuits formed on the first printed circuit board are configured such that the respective neighboring inverter circuits generate AC voltages having phases opposite to each other. The inverter circuits formed on the second printed circuit board are configured such that the respective neighboring inverter circuits generate AC voltages having phases opposite to each other.

To explain another constitution of the invention, it is as follows. The backlight unit includes a plurality of cold cathode fluorescent lamps which extends in the first direction and is arranged in the second direction and a recessed-shape backlight frame which stores the cold cathode fluorescent lamps. The plurality of cold cathode fluorescent lamps includes a group of first cold cathode fluorescent lamps arranged close to a bottom surface of the backlight frame and a group of second cold cathode fluorescent lamps arranged close to the liquid crystal display panel. The rear-side cold cathode fluorescent lamps which constitute the group of first cold cathode fluorescent lamps and the front-side cold cathode fluorescent lamps which constitute the group of second cold cathode fluorescent lamps are alternately arranged in the second direction.

To explain another constitution of the invention, it is as follows. An AC voltage is applied to an electrode arranged on the first side portion of the first cold cathode fluorescent lamp, and an electrode arranged on the second side portion of the first cold cathode fluorescent lamp is connected to a ground. An electrode arranged formed on the first side portion of the second cold cathode fluorescent lamp is connected to the ground, and an AC voltage is applied to an electrode formed on the second side portion of the second cold cathode fluorescent lamp. The electrode which is connected to a ground is arranged closer to the bottom surface of the backlight frame than the electrode to which the AC voltage is applied.

Due to the above-mentioned constitutions, the invention can overcome the drawbacks of the display device of the related art.

According to the display device of the invention, a distance between the neighboring cold cathode fluorescent lamps can be narrowed thus providing a display device which includes a backlight unit of high brightness. Further, the invention can suppress the generation of an undesired electric field in the backlight unit thus suppressing disturbances of images attributed to the undesired electric field whereby images of high quality can be displayed.

DESCRIPTION OF THE PREFERRED EMBODIMENT

Hereinafter, embodiments of the invention are explained in detail in conjunction with drawings showing the embodiments.

Figure 1:
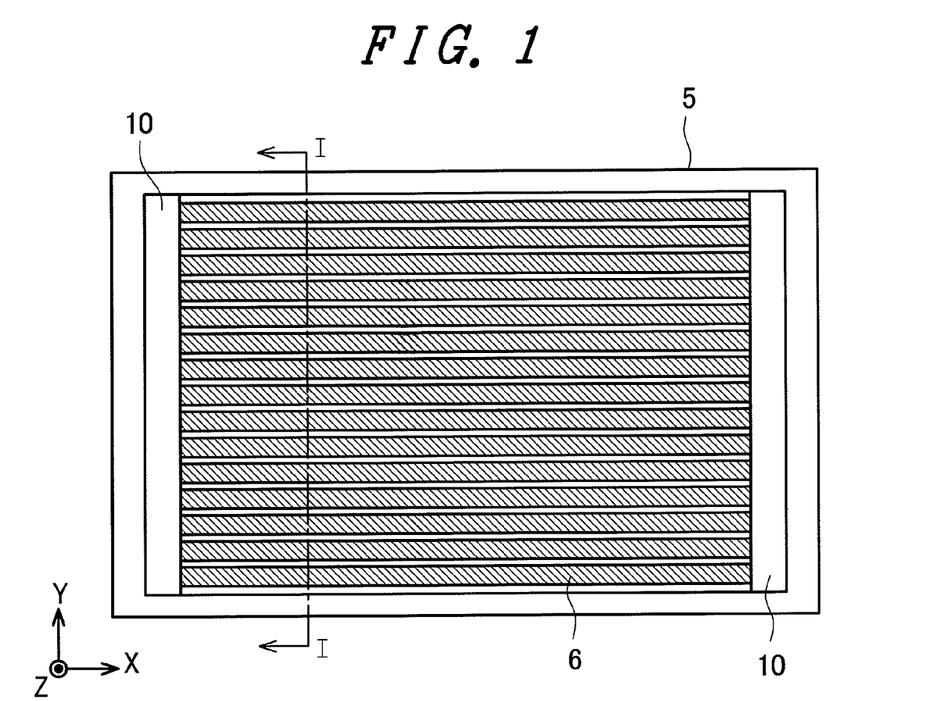
FIG. 1 is a front view of a backlight unit used in a display device according to the invention.
Figure 2:
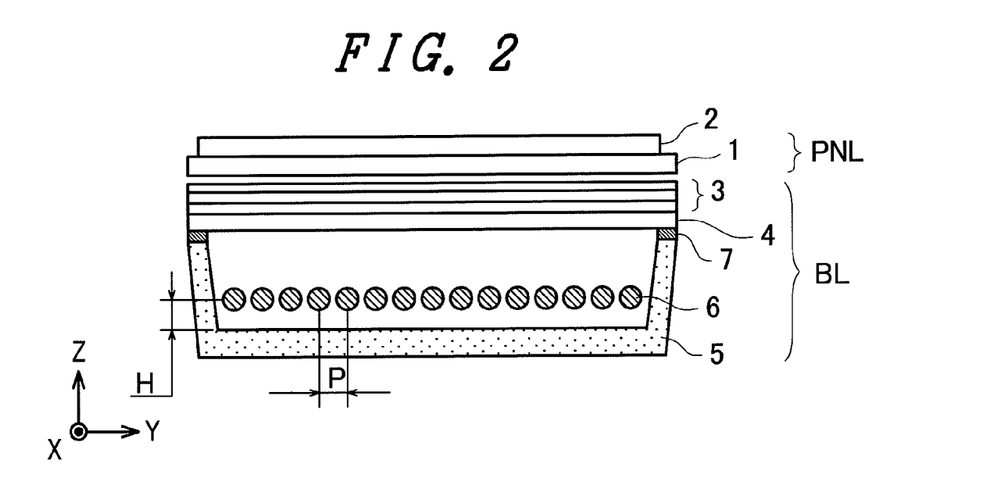
FIG. 2 is a cross-sectional view taken along a line I-I in FIG. 1.

FIG. 1 is a front view of a backlight unit which is used in a display device according to a first embodiment of the invention. FIG. 2 is a cross-sectional view taken along a line I-I in FIG. 1. Particularly, FIG. 2 is a cross-sectional view taken along a longitudinal axis of a rectangular liquid crystal display device. Further, although a light diffusion plate, an optical sheet and a liquid crystal panel are not shown in FIG. 1, these parts are shown in FIG. 2.

The liquid crystal display device includes a liquid crystal panel PNL having a light switching function and a backlight unit BL which supplies light to the liquid crystal panel.

The liquid crystal panel PNL is constituted of two polarizer, a first substrate (hereinafter, referred to as a back substrate) 1 on which thin film transistors are formed and a second substrate (hereinafter, referred to as a face substrate) 2 on which color filters are formed. Liquid crystal is arranged between the back substrate 1 and the face substrate 2.

The backlight unit BL includes a plurality of optical sheets 3, a light diffusion plate 4, a backlight frame 5 and cold cathode fluorescent lamps 6. In an opening portion of the backlight frame 5, the light diffusion plate 4 is arranged by way of a spacer 7 having the resiliency. The plurality of optical sheets 3 is arranged on a liquid crystal panel side of the light diffusion plate 4. The light diffusion plate and the optical sheets diffuse or condense light for making the light emitted from the rod-like cold cathode fluorescent lamps form a uniform surface light source.

The plurality of cold cathode fluorescent lamps 6 which constitutes the light source extends in the horizontal direction (X direction) and is arranged in parallel in the vertical direction (Y direction). Here, in the drawing, the X direction agrees with a long axis of the rectangular display device and the Y direction agrees with a short axis of the rectangular display device, and the Z direction agrees with the thickness direction of the display device.

The cold cathode fluorescent lamps 6 are arranged in the inside of the cup-shaped backlight frame 5. The cold cathode fluorescent lamps 6 are arranged with a gap formed between the cathode tubes 6 and a bottom surface of the backlight frame 5. Further, the cathode tubes 6 are arranged in a state that a distance H between the cold cathode fluorescent lamp 6 and the backlight frame 5 is controlled to become substantially equal with respect to all cold cathode fluorescent lamps. Further, the cold cathode fluorescent lamps are also arranged in a state that a pitch P between the cold cathode fluorescent lamps is controlled to a fixed value. By arranging the cold cathode fluorescent lamps in such a manner, the generation of luminance spots attributed to the arrangement of the light source can be suppressed. Further, the luminance spots are liable to be generated in the vicinity of the electrodes of the cold cathode fluorescent lamps and hence, end portions of the cold cathode fluorescent lamps are covered with end-portion covers 10 for preventing the luminance spots from influencing a display screen.

For example, in the conventional liquid crystal display device of 32 inches, 16 pieces of cold cathode fluorescent lamps are used, wherein a pitch of the cold cathode fluorescent lamps is set to 24 mm. To the contrary, the liquid crystal display device of the invention of 32 inches uses 32 pieces of cold cathode fluorescent lamps in the backlight unit. The 32 pieces of cold cathode fluorescent lamps have tube axes thereof arranged in the horizontal direction and are arranged in parallel in the vertical direction. In the backlight unit, the cold cathode fluorescent lamps each of which has an outer diameter of 3 mm are arranged with the distance H of 8 mm and the pitch P of 12 mm. As a result, the liquid crystal display device can obtain the high-brightness backlight thus enhancing the brightness thereof. Further, it is possible to display high-quality images having no noises on the image display screen of the display device.

Figure 3:
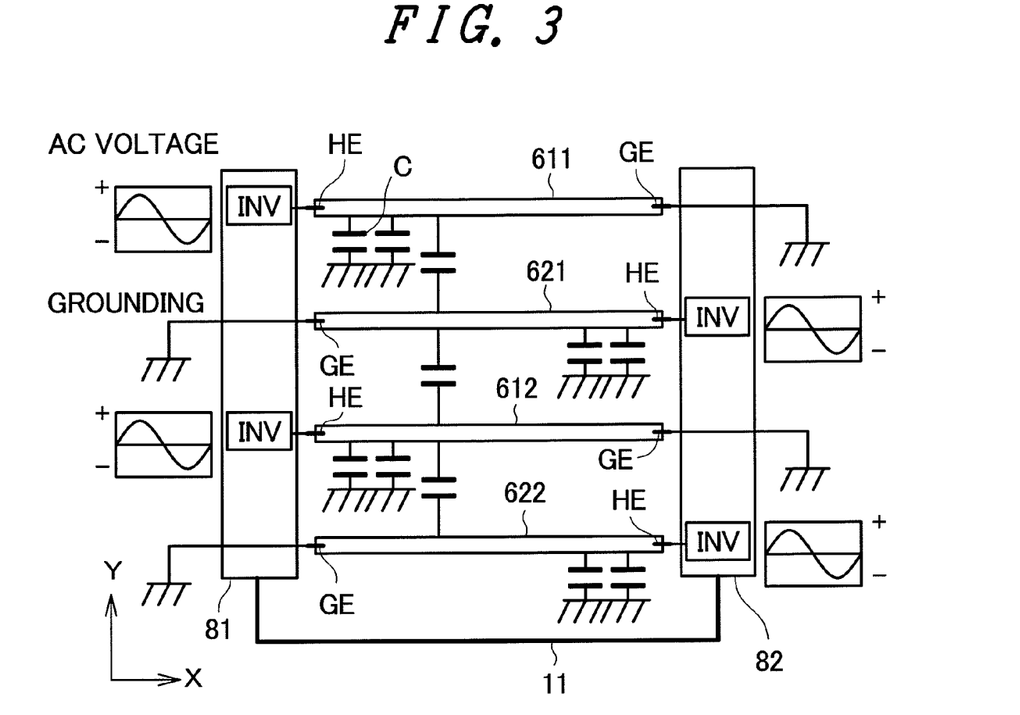
FIG. 3 is an arrangement view of cold cathode fluorescent lamps according to the invention.

FIG. 3 is an arrangement view of the cold cathode fluorescent lamps according to the invention.

The cold cathode fluorescent lamps 6 extend from a first side portion which corresponds to a left side of the screen of the liquid crystal display device toward a second side portion which corresponds to a right side of the screen of the liquid crystal display device. That is, the cold cathode fluorescent lamps 6 extend along an X axis. Further, the plurality of cold cathode fluorescent lamps 6 is arranged from an upper side of the screen toward a lower side of the screen, that is, are arranged in parallel along the Y axis. By arranging the tube axes of the cold cathode fluorescent lamps in a horizontal manner, the non-uniform distribution of gas in the inside of the cathode tubes can be suppressed thus prolonging the lifespan of the cold cathode fluorescent lamps.

Out of the plurality of cold cathode fluorescent lamps, an AC voltage (alternating voltage) having a high frequency is applied to electrodes mounted on first side portions of first cold cathode fluorescent lamps 611 and 612, and electrodes mounted on second side portions of the first cold cathode fluorescent lamps are connected to a reference potential (hereinafter, referred to as "grounded"). In this embodiment, the "grounded" implies that the electrodes are connected to a frame of a liquid crystal module.

Further, out of the plurality of the cold cathode fluorescent lamps, electrodes mounted on first side portions of second cold cathode fluorescent lamps 621 and 622 are grounded, and an AC voltage having the same phase as the AC voltage applied to the first cold cathode fluorescent lamps is applied to electrodes mounted on second side portions of the second cold cathode fluorescent lamps.

The backlight unit shown in FIG. 3 uses 4 pieces of cold cathode fluorescent lamps. An upper first cold cathode fluorescent lamp 611 and an upper second cold cathode fluorescent lamp 621 are arranged on an upper side of the screen, while a lower first cold cathode fluorescent lamp 612 and a lower second cold cathode fluorescent lamp 622 are arranged on a lower side of the screen.

To focus on left end portions of the plurality of cold cathode fluorescent lamps arranged in the backlight unit, along the arrangement direction of the cold cathode fluorescent lamps, a high-frequency AC-voltage applied electrode (hereinafter, referred to as a high-voltage electrode) HE, a reference-potential connected electrode (hereinafter, referred to as a ground electrode) GE, a high-voltage electrode HE and a ground electrode GE are arranged in this order. That is, the high-voltage electrode HE and the ground electrode GE are alternately arranged. Although 4 pieces of cold cathode fluorescent lamps are used in the backlight unit shown in FIG. 3, when a larger number of cold cathode fluorescent lamps is used, these cold cathode fluorescent lamps may be arranged by repeating the above-mentioned order.

Further, the backlight unit shown in FIG. 3 arranges inverter printed circuit boards 8 in a laterally two-split manner. On a first side portion of the backlight unit, a first inverter printed circuit board 81 which mounts a plurality of inverter transformers thereon is arranged, and a high-frequency voltage is supplied to the respective first cold cathode fluorescent lamps 61 from the respective inverter transformers mounted on the first inverter printed circuit board 81. On the other hand, on a second side portion of the backlight unit, a second inverter printed circuit board 82 which mounts a plurality of inverter transformers thereon is arranged, and a high-frequency voltage is supplied to the respective second cold cathode fluorescent lamps 62 from the respective inverter transformers mounted on the second inverter printed circuit board 82.

The high-frequency AC voltage of −2 kV to 2 kV is applied to the electrodes mounted on one ends of the cold cathode fluorescent lamps with a frequency which falls within a range from 30 kHz to 60 kHz.

Further, the respective inverter circuits INV are connected with each other in series using a synchronizing line 11 such that these inverter circuits INV are operated in synchronism with each other. Further, the respective inverter circuits INV supply the high-frequency AC voltage applied to the respective cold cathode fluorescent lamps with the same phase. Here, for synchronizing the operations of the respective inverter circuits INV, the respective inverter circuit INV may be operated in a parallel connection mode.

A parasitic capacitance (capacitance) C is formed between each cold cathode fluorescent lamp and the backlight frame. Particularly, a parasitic capacitance is generated in the vicinity of the electrode to which the high-frequency AC voltage is applied. On the other hand, the backlight frame is grounded in the vicinity of the ground electrode and hence, the parasitic capacitance is hardly generated.

In the backlight unit shown in FIG. 3, at the first side portion or at the second side portion, the electrodes of the neighboring cold cathode fluorescent lamps are arranged such that the high-voltage electrode and ground electrode and the electrodes alternate. Accordingly, a distance between the neighboring capacitances is increased. For example, even when 32 pieces of cold cathode fluorescent lamps are used in the liquid crystal display device of 32 inches, it is sufficient to take parasitic capacitance similar to the parasitic capacitance generated in the conventional backlight unit which uses 16 pieces cold cathode fluorescent lamps into consideration.

The backlight unit of the invention can be driven without increasing the parasitic capacitance generated between the cold cathode fluorescent lamps and the backlight frame even when the high-frequency AC voltage having the same phase is supplied to the respective cold cathode fluorescent lamps from the inverter circuit INV mounted on the first inverter printed circuit board or the second inverter printed circuit board.

When the gap between the neighboring cold cathode fluorescent lamps becomes narrow, the capacitance is generated between the neighboring cold cathode fluorescent lamps. Although the capacitance is also formed between the first cold cathode fluorescent lamp 61 and the second cold cathode fluorescent lamp 62, the high-frequency voltage is applied to one of the cold cathode fluorescent lamps 61, 62, and the ground potential (reference potential) is applied to another of the cold cathode fluorescent lamps 61, 62 and hence, an electric potential difference between the neighboring electrodes can be reduced to a value corresponding to amplitude of the high-frequency voltage. Accordingly, it is possible to suppress an induced voltage stored in the capacitance.

Further, the inverter printed circuit board is split in two and hence, it is possible to arrange the inverter transformers on the inverter printed circuit boards without narrowing the distance between the inverter transformers.

In this embodiment, the high-frequency AC voltage is applied to the electrode of the cold cathode fluorescent lamp mounted on one end and the electrode mounted on the other end of the cold cathode fluorescent lamp is connected to a ground. Since the electrode on the other end is connected to the ground, the possibility of generation of luminance spots is low even when phases of the inverter circuits are shifted from each other more or less. Here, the capacitance generated between the cold cathode fluorescent lamp and the backlight frame is allowable so long as noises in a lateral stripe pattern are not generated on the screen.

Figure 4:
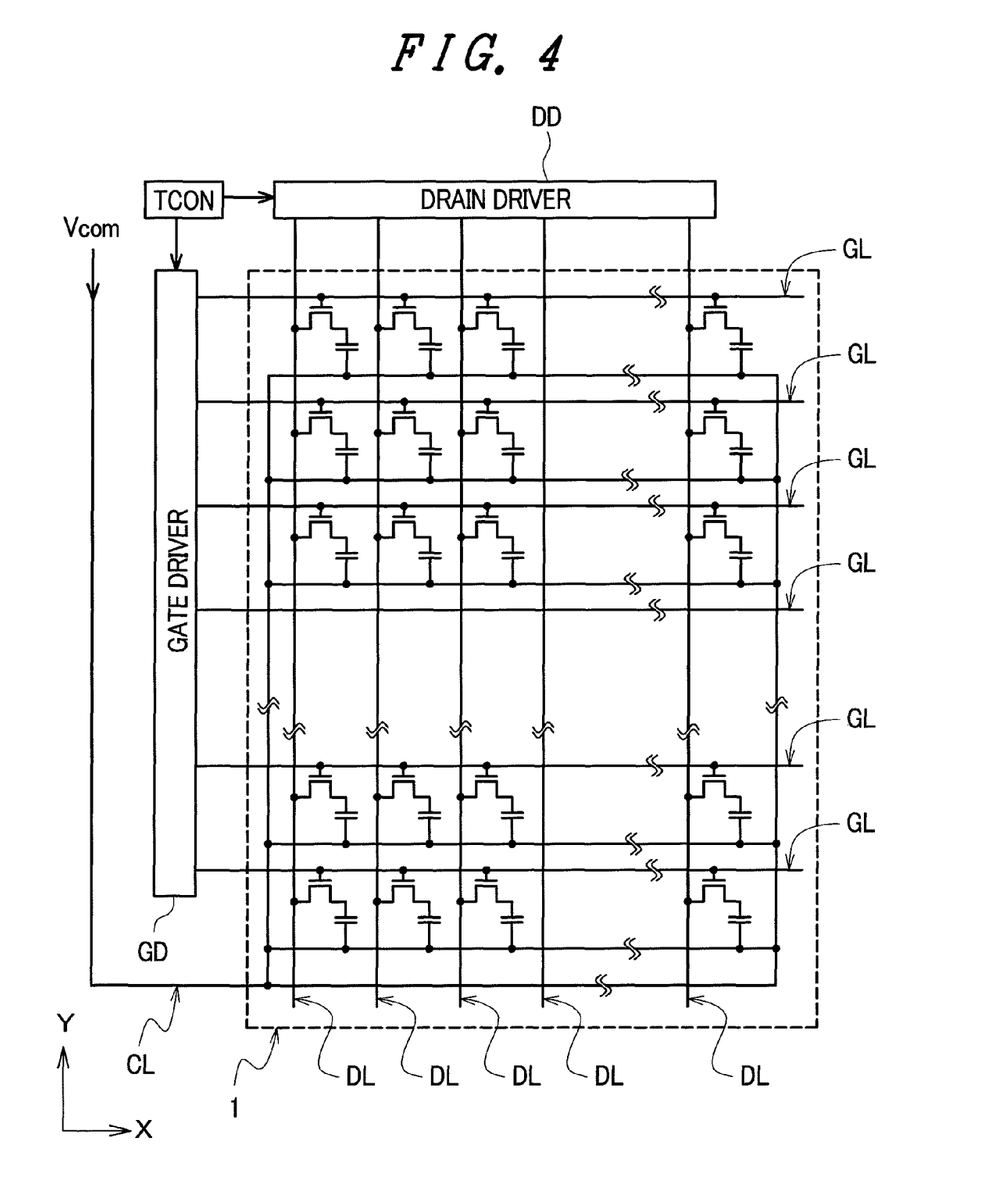
FIG. 4 is a circuit diagram of circuits on a lower substrate of the display device according to the invention.

FIG. 4 is a circuit diagram of a circuit mounted on the back substrate which constitutes the display device according to the invention.

A plurality of scanning lines (also referred to as gate lines) GL which extends in the first direction (X direction) and is arranged in parallel in the second direction (Y direction) which intersects the first direction and a plurality of data lines DL (also referred to as drain lines) which extends in the second direction (Y direction) and is arranged in parallel in the first direction (X direction) which intersects the second direction are formed on a main surface of the back substrate 1. The gate lines GL are connected to a gate driver GD, and the drain lines DL are connected to a drain driver DD.

A timing control circuit TCON supplies timing signals to the gate driver GD and the drain driver DD.

Thin film transistors TFT are formed in regions surrounded by these lines which are arranged in a matrix array for respective pixels. The thin film transistor TFT has a gate electrode thereof connected to the gate line, a drain electrode thereof connected to the drain line and a source electrode thereof connected to the pixel electrode respectively.

Further, on the main surface of the back substrate, common lines CL are arranged in parallel with the gate lines. A capacitance is generated between the common line and the pixel electrode.

Figure 5:
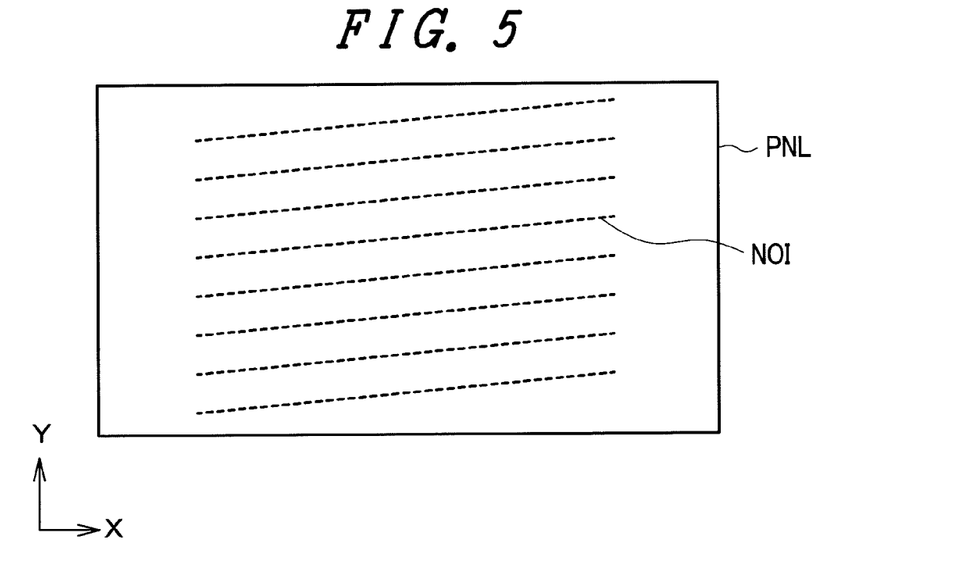
FIG. 5 is a view showing a generation state of noises in a lateral stripe pattern which appear on a screen of a liquid crystal display device.

FIG. 5 is a view showing a state in which noises in a lateral stripe pattern which appear on the screen of the liquid crystal display device are generated. The noises NOI are attributed to a large capacitance generated between the cold cathode fluorescent lamp and the backlight frame, and are generated due to interference between a frequency of the voltage for turning on the cold cathode fluorescent lamp and a frequency of the signal for displaying an image. In the conventional backlight, an induced voltage of a high voltage is stored in the capacitance generated between the respective cold cathode fluorescent lamp and the backlight frame. An undesired electric field which is generated due to the parasitic capacitance jumps into a signal circuit for driving the liquid crystal screen. As a result, the liquid crystal panel is driven with the undesired electric field thus generating the noises in a stripe pattern. When the noises in a stripe pattern arrive at a level which allows a viewer to detect the noises with his/her naked eyes, the viewer feels discomfort.

Figure 6:
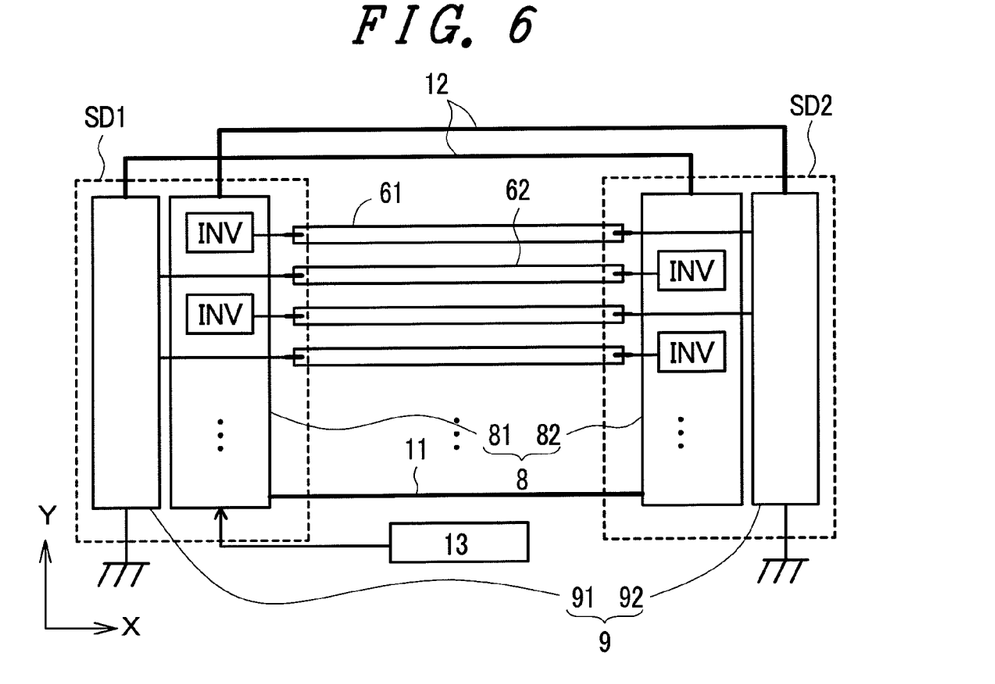
FIG. 6 is a schematic view of a circuit of the backlight unit according to the invention.

FIG. 6 is a schematic view of circuits of the backlight unit according to the invention.

In the same manner as the constitution shown in FIG. 3, in FIG. 6, a left side of the first cold cathode fluorescent lamp 61 and the second cold cathode fluorescent lamp 62 is assumed as a first side portion SD1, and a right side of the first cold cathode fluorescent lamp 61 and the second cold cathode fluorescent lamp 62 is assumed as a second side portion SD2.

The first inverter printed circuit board 81 on which the plurality of inverter circuits INV is mounted is arranged on the first side portion SD1. To the inverter circuit INV of the first inverter printed circuit board 81, one electrode (high-frequency AC-voltage applied electrode) HE of the first-kind cold cathode fluorescent lamp is connected. The other electrode (ground electrode) GE of the first-kind cold cathode fluorescent lamp is connected to a second grounding printed circuit board 92 which is arranged on the second side portion SD2.

The second inverter printed circuit board 82 on which the plurality of inverter circuits INV is mounted is arranged on the second side portion SD2. To the inverter circuit INV of the second inverter printed circuit board 82, one electrode of the second-kind cold cathode fluorescent lamp, that is, the so-called high-voltage electrode is connected. The other electrode of the second-kind cold cathode fluorescent lamp, that is, the so-called ground electrode is connected to a first grounding printed circuit board 91 which is arranged on the first side portion SD1.

The first-kind cold cathode fluorescent lamp 61 which is connected to the first inverter printed circuit board 81 and the second-kind cold cathode fluorescent lamp 62 which is connected to the second inverter printed circuit board 82 are arranged interdigital arrangement.

The ground electrodes of the first and second cold cathode fluorescent lamps are respectively connected to the ground circuits of the respective inverter circuits INV via lamp return lines 12. Due to such a constitution, it is possible to control electric currents of the cold cathode fluorescent lamps. The lamp return line may be arranged for every cold cathode fluorescent lamp, or the lamp return line also may be used in common collectively for the first-kind cold cathode fluorescent lamps 61 or the second-kind cold cathode fluorescent lamps 62.

The signal printed circuit board 13 is connected to the first inverter printed circuit board 81 and supplies signals for driving the cold cathode fluorescent lamps to the first inverter printed circuit board 81. The first inverter printed circuit board 81 and the second inverter printed circuit board 82 are connected to each other using a synchronizing line 11, and the respective inverter circuits are connected in series so as to allow the respective inverter circuits to have the common operation timing. Here, the signal from the signal substrate 13 may be inputted into the first inverter printed circuit board and the second inverter printed circuit board in parallel.

When a voltage having a waveform shown in FIG. 3 is applied to the circuit shown in FIG. 6, phases of the high-frequency AC voltages applied to the respective cold cathode fluorescent lamps from the respective inverter circuits agree with each other. That is, the high-frequency AC voltages for driving the cold cathode fluorescent lamps are all high-frequency voltages having the same phase as viewed from the inverter circuits.

The transformer of the inverter circuit generates a voltage of approximately 2 kV. In this embodiment, since all inverter circuits generate high-frequency voltages having the same phase, the inverter circuits mounted on the inverter printed circuit board 8 can be easily insulated from each other. Further, the ground electrodes GE of the neighboring cold cathode fluorescent lamps are connected to the grounding printed circuit board different from the inverter printed circuit board.

Further, the inverter printed circuit boards 8 are respectively arranged on sides close to the high-voltage electrodes of the cold cathode fluorescent lamps, and the grounding printed circuit boards 9 are respectively arranged on sides away from the electrodes of the cold cathode fluorescent lamps. Due to such a constitution, connection lines which connect the high-voltage electrodes of the cold cathode fluorescent lamps and the inverters can be shortened. On the other hand, lines which connect the grounding printed circuit boards and the ground electrodes are longer than the lines which connect the inverter printed circuit boards and the high-voltage electrode. The lines on the ground electrode side are not relevant to the jumping of noises when the cold cathode fluorescent lamps are driven and hence, the lines on the ground electrode side may be elongated.

According to the invention, a distance between the neighboring cold cathode fluorescent lamps can be shortened and hence, an image display device of high brightness and high definition can be realized.

In the above-mentioned embodiment, the inverter circuits are arranged in a laterally split manner on the back surface of the backlight frame. However, the invention is not limited to such an arrangement, and the inverter circuits may be arranged in a vertically split manner on the back surface of the backlight frame or the inverter may be arranged on a center portion of the backlight frame. In this embodiment, by arranging the inverter circuits in the vicinity of the high-voltage electrodes, lines which connect the inverter circuits and the high-voltage electrodes can be shortened thus reducing jumping of noises.

Figure 7:
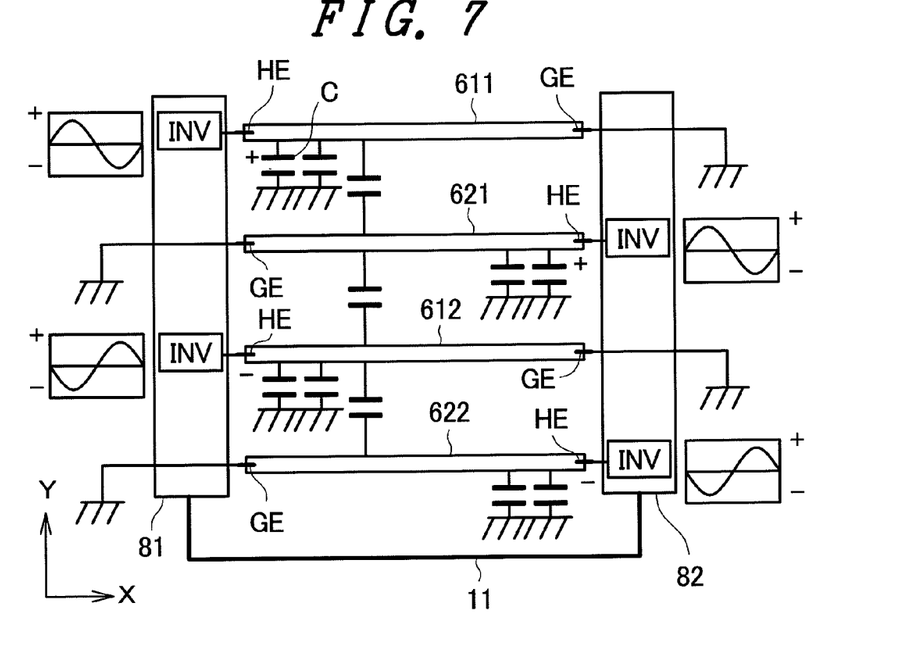
FIG. 7 is an arrangement view of the cold cathode fluorescent lamps according to the invention.

FIG. 7 is an arrangement view of cold cathode fluorescent lamps according to a second embodiment of the invention. Parts having functions identical with the functions of the parts of the above-mentioned embodiment are given the same symbols.

A constitutional feature which makes this embodiment differ from the embodiment shown in FIG. 3 lies in phases of AC voltages inputted to the cold cathode fluorescent lamps.

In this embodiment, a backlight unit includes a plurality of cold cathode fluorescent lamps which extends toward a second side portion from a first side portion. The cold cathode fluorescent lamps include the first cold cathode fluorescent lamps and the second cold cathode fluorescent lamps, and the first cold cathode fluorescent lamps and the second cold cathode fluorescent lamps are alternately arranged along the Y axis. An AC voltage is applied to electrodes of the first cold cathode fluorescent lamps formed on the first side portion, and electrodes of the first cold cathode fluorescent lamps formed on the second side portion are grounded. On the other hand, an AC voltage is applied to electrodes of the second cold cathode fluorescent lamps formed on the second side portion, and electrodes of the second cold cathode fluorescent lamps formed on the first side portion are grounded. The AC voltages having phases opposite to each other are applied to two neighboring first cold cathode fluorescent lamps, and the AC voltages having phases opposite to each other are applied to two neighboring second cold cathode fluorescent lamps.

In the backlight unit shown in FIG. 7, 4 pieces of cold cathode fluorescent lamps are used. An upper first cold cathode fluorescent lamp 611 and an upper second cold cathode fluorescent lamp 621 are arranged on an upper side of a screen, and a lower first cold cathode fluorescent lamp 612 and a lower second cold cathode fluorescent lamp 622 are arranged on a lower side of the screen.

To focus on left end portions of the plurality of cold cathode fluorescent lamps arranged in the backlight unit, along the arrangement direction of the cold cathode fluorescent lamps, a high-voltage electrode HE, a ground electrode GE, a high-voltage electrode HE, and a ground electrode GE are arranged in this order. That is, the high-voltage electrodes HE and the ground electrode GE are alternately arranged. Although 4 pieces of cold cathode fluorescent lamps are used in the backlight unit shown in FIG. 7, when a larger number of cold cathode fluorescent lamps is used, these cold cathode fluorescent lamps may be arranged by repeating the above-mentioned order.

Further, in this embodiment, the AC voltages having phases opposite to each other are applied to two neighboring first cold cathode fluorescent lamps 611, 612, and the AC voltages having phases opposite to each other are applied to two neighboring second cold cathode fluorescent lamps 621, 622.

Due to such a constitution, in the parasitic capacitance generated between the first cold cathode fluorescent lamp 611 and the backlight frame 5 and in the parasitic capacitance generated between the first cold cathode fluorescent lamp 612 and the backlight frame 5, charges having polarities opposite to each other are respectively stored. Further, in the parasitic capacitance generated between the second cold cathode fluorescent lamp 621 and the backlight frame 5 and in the parasitic capacitance generated between the second cold cathode fluorescent lamp 622 and the backlight frame 5, charges having polarities opposite to each other are respectively stored. As a result, with respect to the neighboring first cold cathode fluorescent lamps, the parasitic capacitances having polarities opposite to each other are alternately generated in the capacitances generated between the first cold cathode fluorescent lamps and the backlight frame and hence, the charges are canceled each other between the respective capacitances thus preventing an induced voltage of high voltage from being stored between the cold cathode fluorescent lamps and the backlight frame.

Further, when the distance between the cold cathode fluorescent lamps is narrowed, the capacitance is generated between the neighboring cold cathode fluorescent lamps. That is, the capacitance is also generated between the first cold cathode fluorescent lamp 61 and the second cold cathode fluorescent lamp 62. However, for example, the high-frequency voltage is applied to the electrode of the first cold cathode fluorescent lamp on the first side portion, and the ground potential (reference potential) is applied to the second cold cathode fluorescent lamp on the first side portion and hence, the potential difference between the neighboring cold cathode fluorescent lamps assumes a value corresponding to amplitude of the high-frequency voltage. Accordingly, it is possible to prevent the induced voltage from being stored in the capacitance generated between the cold cathode fluorescent lamps.

According to this embodiment, with respect to the cold cathode fluorescent lamps which are connected to the same inverter printed circuit board, the AC voltages having phases thereof shifted by 180° from each other are applied to the electrodes of the neighboring cold cathode fluorescent lamps on the same side. With respect to the plurality of the cold cathode fluorescent lamps which are connected to the same inverter printed circuit board, the capacitance generated between the cold cathode fluorescent lamp and the backlight is canceled by the capacitance generated between the neighboring cold cathode fluorescent lamps and hence, the generation of an electric field synchronized with a frequency of the voltage for turning on the cold cathode fluorescent lamp can be suppressed thus suppressing the luminance spots of the backlight. Further, since the induced voltage is canceled and hence, the generation of noises on the screen can be suppressed.

Further, since the charge can be canceled between the capacitances, the distance between the cold cathode fluorescent lamps can be narrowed thus enhancing the brightness of the backlight.

In this embodiment, the high-frequency AC voltage is applied to the electrode of the cold cathode fluorescent lamp on one end and the electrode on the other end of the cold cathode fluorescent lamp is connected to a ground. Since the electrode on the other end is connected to the ground, the possibility of generation of luminance spots is low even when phases of the AC voltages of the inverter circuits are shifted more or less. In this case, the capacitance generated between the cold cathode fluorescent lamp and the backlight frame is allowable so long as noises in a lateral stripe pattern are not generated on the screen.

When the high-frequency AC voltage is applied to the cold cathode fluorescent lamp from both sides as in the case of the related art, the inverter circuits which supply the AC voltages having phases opposite to each other are alternately arranged on the printed circuit board and hence, it is necessary to sufficiently ensure the insulation between the neighboring inverter circuits. In this embodiment, the inverter transformers are arranged alternately in the lateral direction and hence, a distance between the neighboring inverter transformers can be increased.

Further, the inverter circuits which are arranged adjacent to each other on one inverter printed circuit board respectively generate the high-frequency voltages having phases opposite to each other. However, since the large distance can be ensured between the inverter circuits, the insulation between the inverter circuits on the inverter printed circuit board 8 can be easily achieved. Further, the ground electrodes of the neighboring cold cathode fluorescent lamps are formed on a printed circuit board different from the inverter printed circuit board.

Figure 8:
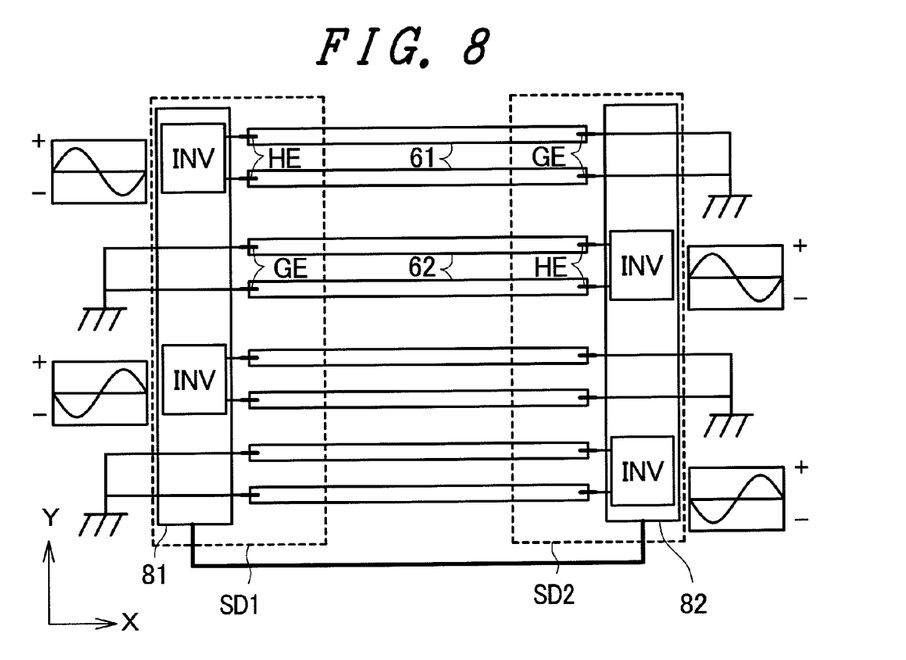
FIG. 8 is an arrangement view of the cold cathode fluorescent lamps according to the invention.

FIG. 8 is an arrangement view of cold cathode fluorescent lamps according to a modification of the second embodiment of the invention. Parts having functions identical with the functions of the parts of the above-mentioned embodiment are given the same symbols.

A constitutional feature which makes a backlight unit shown in FIG. 8 differ from the backlight unit shown in FIG. 7 lies in the arrangement of the electrodes of the cold cathode fluorescent lamp.

In the backlight unit shown in FIG. 8, 8 pieces of cold cathode fluorescent lamps are used.

To focus on the left end portions SD1 of the plurality of cold cathode fluorescent lamps arranged in the backlight unit, along the arrangement direction of the cold cathode fluorescent lamps, a high-voltage electrode HE, a high-voltage electrode HE, a ground electrode GE, a ground electrode GE, a high-voltage electrode HE, a high-voltage electrode HE, a ground electrode GE and a ground electrode GE are arranged in this order. That is, two high-voltage electrodes HE and two ground electrodes GE are alternately arranged. Although 8 pieces of cold cathode fluorescent lamps are used in the backlight unit shown in FIG. 8, when a larger number of cold cathode fluorescent lamps is used, these cold cathode fluorescent lamps may be arranged by repeating the above-mentioned order.

Further, in this embodiment, the AC voltages having phases opposite to each other are supplied from the neighboring inverters on the same inverter printed circuit board. However, in the same manner as the first embodiment, the AC voltages having the same phase may be supplied from the neighboring inverters.

By arranging the cold cathode fluorescent lamps as shown in FIG. 8, the parasitic capacitances between the cold cathode fluorescent lamps and the backlight frame can be suppressed and, at the same time, the number of the cold cathode fluorescent lamps can be increased without increasing the number of inverters.

Figure 9:
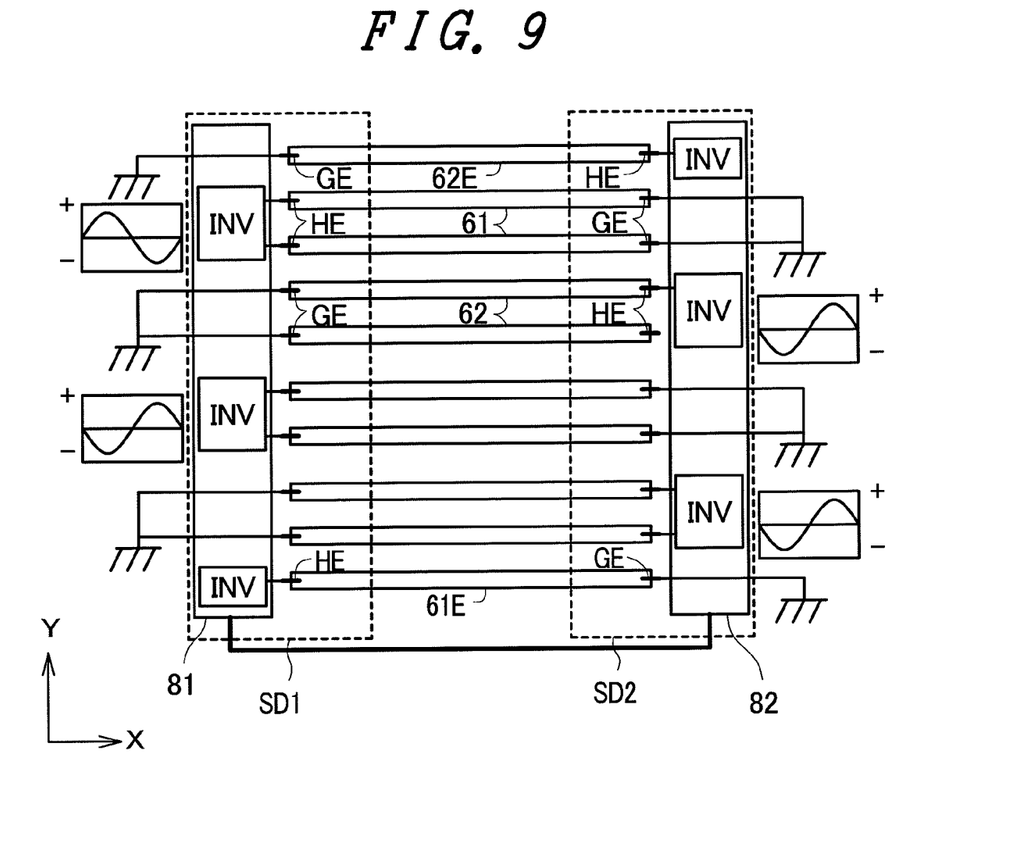
FIG. 9 is an arrangement view of the cold cathode fluorescent lamps according to the invention.

FIG. 9 is an arrangement view of cold cathode fluorescent lamps according to a further modification of the second embodiment of the invention. Parts having functions identical with the functions of the parts of the above-mentioned embodiment are given the same symbols.

In the backlight unit shown in FIG. 9, with respect to the cold cathode fluorescent lamps 61E, 62E which are arranged on end portions in the arrangement direction (Y direction) of the plurality of cold cathode fluorescent lamps which is arranged in the backlight unit, the cold cathode fluorescent lamps 61E, 62E are respectively connected to inverters one by one. With respect to the other cold cathode fluorescent lamps, in the same manner as the constitution shown in FIG. 8, two cold cathode fluorescent lamps are connected to one inverter.

To focus on the left end portions SD1 of the plurality of cold cathode fluorescent lamps arranged in the backlight unit, along the arrangement direction (Y direction) of the cold cathode fluorescent lamps, a ground electrode GE, a high-voltage electrode HE, a high-voltage electrode HE, a ground electrode GE, a ground electrode GE, a high-voltage electrode HE, a high-voltage electrode HE, a ground electrode GE, a ground electrode GE and a high-voltage electrode HE are arranged in this order.

By arranging the cold cathode fluorescent lamps as described above, either one of the neighboring high-voltage electrodes HE of the cold cathode fluorescent lamps in the Y direction becomes the ground electrode GE.

The high-voltage electrode HE of the cold cathode fluorescent lamp is always arranged adjacent to the ground electrode GE in the Y direction. According to this embodiment, the parasitic capacitances generated between the cold cathode fluorescent lamps and the backlight frame can be suppressed and, further, the number of the cold cathode fluorescent lamps can be increased without increasing the number of inverters.

Further, in this embodiment, although the AC voltages having phases opposite to each other are supplied from the neighboring inverters, in the same manner as the first embodiment, the AC voltages having the same phase may be supplied from the neighboring inverters.

Figure 10:
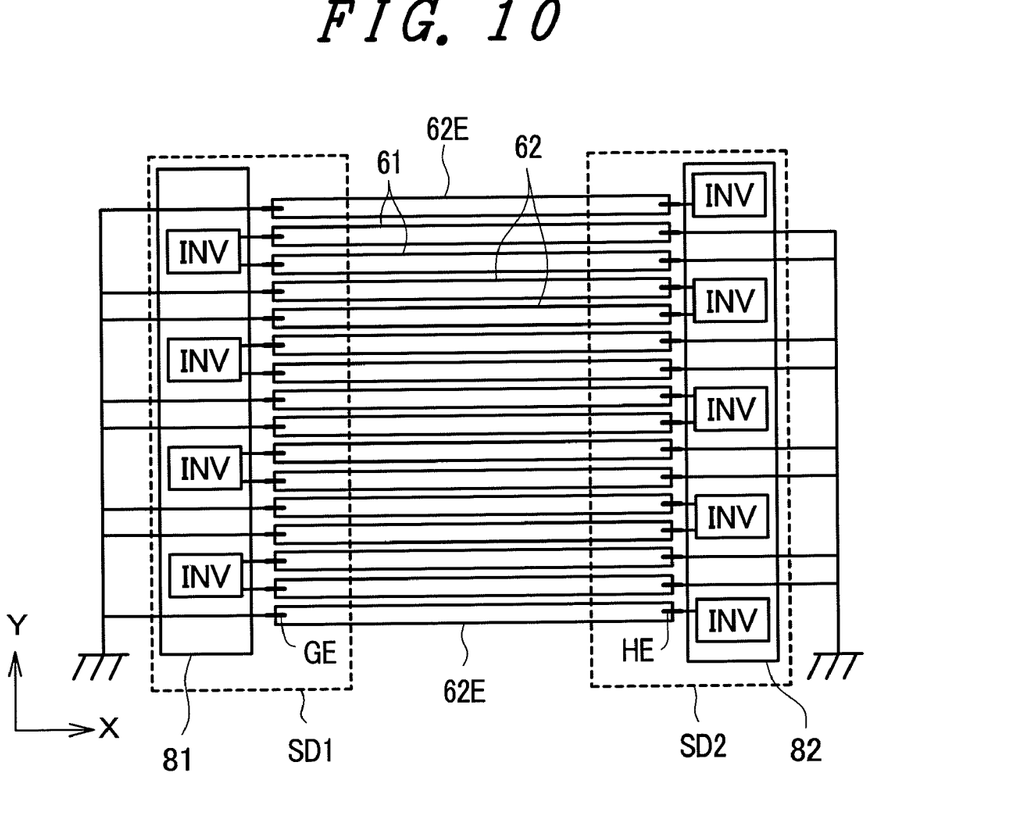
FIG. 10 is an arrangement view of the cold cathode fluorescent lamps according to the invention.

FIG. 10 is an arrangement view of cold cathode fluorescent lamps when 16 pieces of cold cathode fluorescent lamps are used. Parts having functions identical with the functions of the parts of the above-mentioned embodiment are given the same symbols.

In the backlight unit shown in FIG. 10, cold cathode fluorescent lamps which are arranged on end portions of the arrangement direction (Y direction) of the plurality of cold cathode fluorescent lamps arranged in the backlight unit are respectively connected to one inverter. Further, with respect to the cold cathode fluorescent lamps 62E which are arranged on an upper end portion of a screen and a lower end portion of the screen, high-voltage electrodes HE and ground electrodes GE are arranged in the same direction.

With respect to other cold cathode fluorescent lamps 61, 62, in the same manner as the constitution shown in FIG. 8, two cold cathode fluorescent lamps are connected to one inverter.

By arranging the cold cathode fluorescent lamps in this manner, the high-voltage HE of the cold cathode fluorescent lamp is always arranged adjacent to the ground electrodes GE in the Y direction.

Although the backlight unit shown in FIG. 10 uses 16 pieces of cold cathode fluorescent lamps, 32 pieces of cold cathode fluorescent lamps may be used to apply the invention to the liquid crystal display device of 32 inches explained in conjunction with the first embodiment.

Further, in this embodiment, the AC voltages having phases opposite to each other may be supplied from the neighboring inverters or the AC voltages having the same phases may be supplied from the neighboring inverters.

Figure 11:
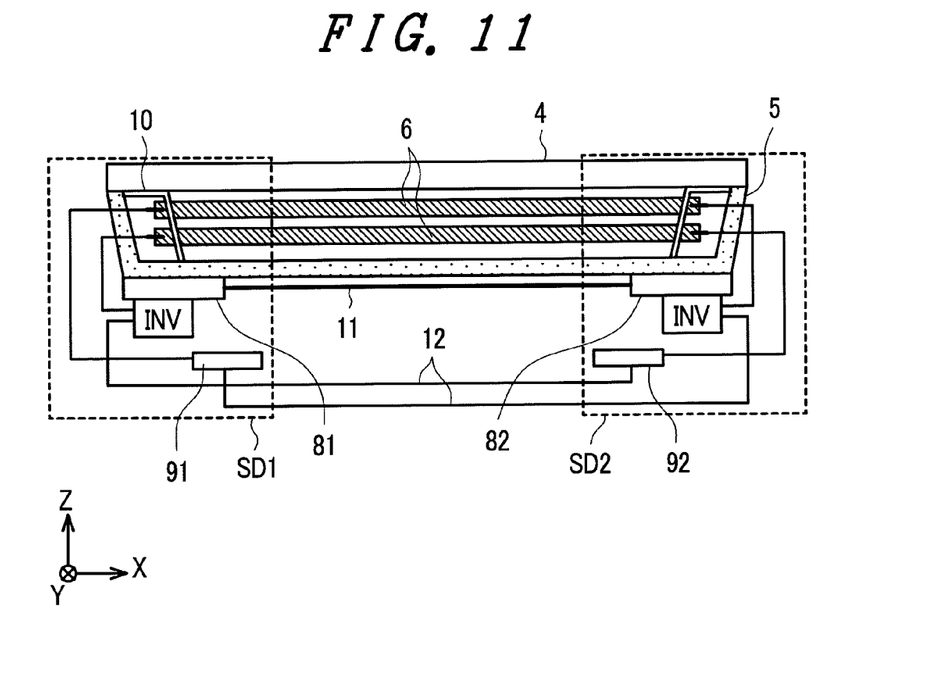
FIG. 11 is an arrangement view of inverter printed circuit boards and grounding printed circuit boards of the invention.

FIG. 11 is a cross-sectional view taken along a line I-I in FIG. 1 showing a third embodiment, and is particularly an arrangement view of the inverter printed circuit board and the grounding printed circuit board. Parts which are identical with the parts in the first embodiment are given the same symbols.

The backlight unit includes a plurality of cold cathode fluorescent lamps which extends in the first direction (X direction) and is arranged in parallel in the second direction (Y direction), and a recessed backlight frame 5 which houses the cold cathode fluorescent lamps. Here, the recessed backlight frame 5 may be formed using one plate by press forming or may be formed by combining a plurality of parts.

A first inverter printed circuit board 81 which mounts an inverter thereon and a second inverter printed circuit board 82 which mounts an inverter thereon are arranged on a back surface of the backlight frame 5. Further, a first grounding printed circuit board 91 and a second grounding printed circuit board 92 are also arranged on the back surface of the backlight frame 5.

The first inverter printed circuit board 81 and the first grounding printed circuit board 91 are arranged on a first side portion SD1. On the other hand, the second inverter printed circuit board 82 and the second grounding printed circuit board 92 are arranged on a second side portion SD2. The cold cathode fluorescent lamps 6 are constituted of a first-kind cold cathode fluorescent lamp and a second-kind cold cathode fluorescent lamp.

The first-kind cold cathode fluorescent lamp has a high-voltage electrode thereof connected to an inverter circuit INV of the first inverter printed circuit board 81, and has a ground electrode thereof connected to the second grounding printed circuit board 92 arranged on the second side portion SD2. Further, the second-kind cold cathode fluorescent lamp has a high-voltage electrode thereof connected to an inverter circuit INV of the second inverter printed circuit board 82, and has a ground electrode thereof connected to the first grounding printed circuit board 91 arranged on the first side portion SD1.

Still further, the second-kind cold cathode fluorescent lamp is arranged at a position close to the liquid crystal panel than the first-kind cold cathode fluorescent lamp.

The first inverter printed circuit board 81 and the first grounding printed circuit board 91 are arranged with a gap therebetween in the height direction (Z-axis direction). On the other hand, the second inverter printed circuit board 82 and the second grounding printed circuit board 92 are also arranged with a gap therebetween in the height direction. Also in this embodiment, in the same manner as the first embodiment, to shorten a connection line between the inverter circuit and the high-voltage electrode, the inverter printed circuit board is arranged at a position closer to the electrode of the cold cathode fluorescent lamp than the grounding printed circuit board.

Further, since the inverter printed circuit board and the grounding printed circuit board are arranged on the back surface of the backlight frame, it is possible to reduce a profile of the whole liquid crystal display device. Further, by arranging the inverter printed circuit board and the grounding printed circuit board with a stepped portion therebetween in the height direction, an exposure area of the back surface of the backlight frame 5 can be increased thus facilitating the radiation of heat of the cold cathode fluorescent lamp.

Figure 12:
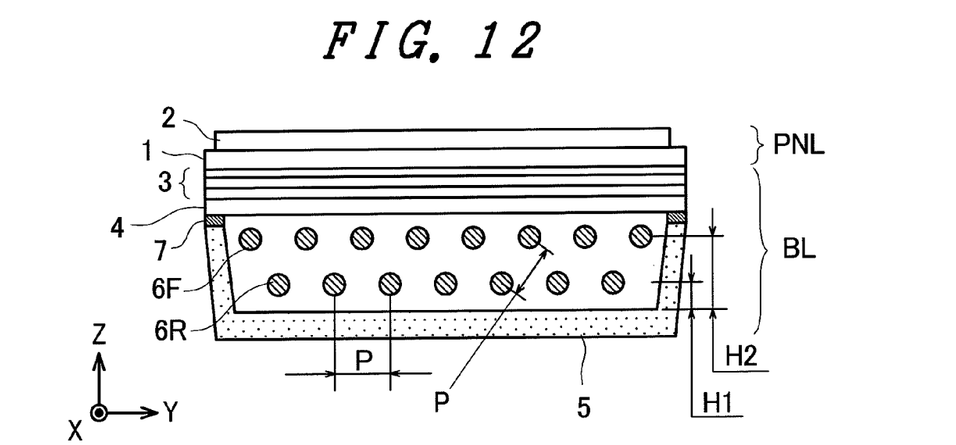
FIG. 12 is a cross-sectional view of the backlight unit according to the invention.

FIG. 12 is a cross-sectional view taken along a Y-Z axis of the backlight unit shown in FIG. 11. Parts identical with the parts shown in FIG. 2 are given the same symbols.

The plurality of cold cathode fluorescent lamps are constituted of a group of rear-side cold cathode fluorescent lamps 6R arranged close to a bottom surface of the backlight frame and a group of front-side cold cathode fluorescent lamps 6F arranged close to the liquid crystal panel. The rear-side cold cathode fluorescent lamps 6R and the front-side cold cathode fluorescent lamps 6F are alternately arranged in the second direction.

In this embodiment, the first-kind cold cathode fluorescent lamps 61 are arranged on a bottom surface side of the backlight frame 5, and the second-kind cold cathode fluorescent lamps 62 are arranged on a liquid crystal panel side. By setting a height H2 of the second-kind cold cathode fluorescent lamps 62 from the bottom surface of the backlight frame larger than a height H1 of the first-kind cold cathode fluorescent lamps 61 from the bottom surface of the backlight frame, the cold cathode fluorescent lamps can be arranged without narrowing a distance P between the cold cathode fluorescent lamps.

Since the sufficient distance can be ensured between the cold cathode fluorescent lamps, the generation of noises on the screen can be suppressed.

Further, since the distance between the neighboring cold cathode fluorescent lamps can be increased, a leaking current between the cold cathode fluorescent lamps can be prevented thus realizing the backlight unit of low power consumption and low heat generation.

In this embodiment, the first-kind cold cathode fluorescent lamps are arranged on the bottom surface side of the backlight frame, and the second-kind cold cathode fluorescent lamps are arranged on the liquid crystal panel side of the backlight frame. However, the second-kind cold cathode fluorescent lamps may be arranged on the bottom surface side of the backlight frame and the first-kind cold cathode fluorescent lamps may be arranged on the liquid crystal panel side of the backlight frame.

Figure 13:
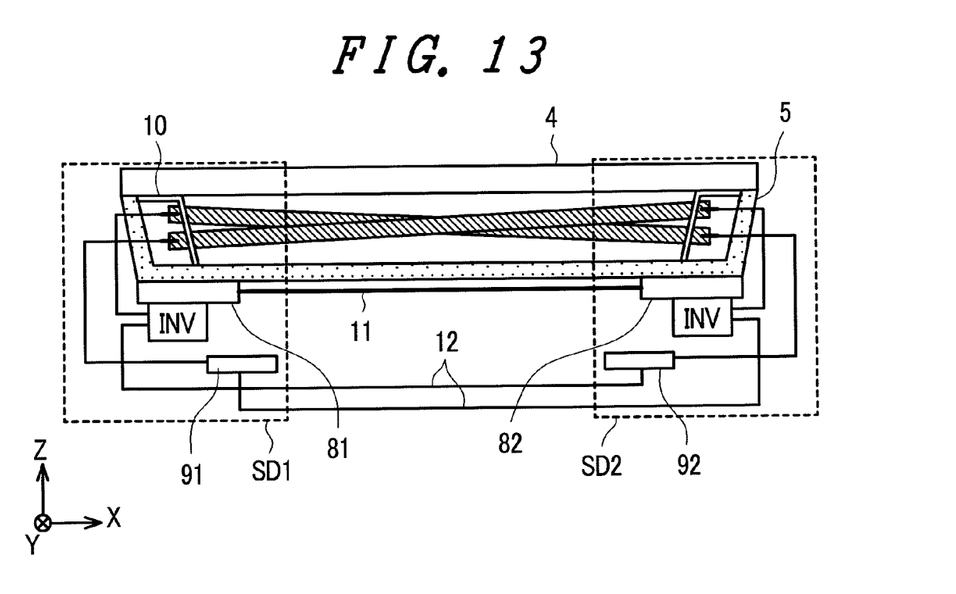
FIG. 13 is a cross-sectional view of the backlight unit according to the invention.

FIG. 13 is a cross-sectional view taken along a line X-Z axis of the backlight unit showing a fourth embodiment. Parts identical with the parts shown in FIG. 9 are given the same symbols.

The backlight unit BL includes first cold cathode fluorescent lamps 61 which extend toward a second side portion SD2 from a first side portion SD1 and second cold cathode fluorescent lamps 62 arranged adjacent to the first cold cathode fluorescent lamps 61. Further, the backlight unit BL includes a recessed backlight frame 5 for housing the cold cathode fluorescent lamps.

An AC voltage is applied to electrodes of the first cold cathode fluorescent lamps 61 arranged on the first side portion SD1, and a ground potential is applied to electrodes of the first cold cathode fluorescent lamps 61 arranged on the second side portion SD2.

On the other hand, a ground potential is applied to electrodes of the second cold cathode fluorescent lamps 62 arranged on the first side portion SD1, and an AC voltage is applied to electrodes of the second cold cathode fluorescent lamps 62 arranged on the second side portion SD2.

With respect to these first cold cathode fluorescent lamps and second cold cathode fluorescent lamps, the electrodes to which the ground potential is applied are arranged at a position closer to a bottom surface of the backlight frame than the electrodes to which the AC voltage is applied. That is, the electrodes to which the high-frequency AC voltage is applied are arranged away from the bottom surface of the backlight frame.

According to this embodiment, the electrodes to which the high-frequency AC voltage is applied are arranged away from the bottom surface of the backlight frame and, at the same time, these electrodes are arranged away from the electrodes of the neighboring cold cathode fluorescent lamps to which the ground potential is applied. Due to such a constitution, this embodiment can suppress the generation of a leaking current between the high-voltage electrode and the cold cathode fluorescent lamp arranged adjacent to the high-voltage electrode, and the generation of a leaking current between the high-voltage electrode and the backlight frame. That is, in addition to the advantageous effects of the above-mentioned embodiments, this embodiment can also have the advantageous effect that the leaking current between the cold cathode fluorescent lamp and the backlight frame can be suppressed.

Further, by changing a distance from the lower frame to the cold cathode fluorescent lamps between a high voltage portion and a low voltage portion, the brightness difference in the lateral direction can be reduced.

What is claimed is:

1. A liquid crystal display device comprising:
   a liquid crystal panel which interposes liquid crystal between a first panel substrate having thin film transistors and a second panel substrate having color filters; and
   a backlight unit which supplies light to the liquid crystal panel, wherein
   the backlight unit includes a plurality of cold cathode fluorescent lamps which extends toward a second side portion from a first side portion;
   the cold cathode fluorescent lamps include a first cold cathode fluorescent lamp and a second cold cathode fluorescent lamp;
   the first cold cathode fluorescent lamp connects an electrode formed on a first side portion thereof to an inverter circuit on a first printed circuit board and connects an electrode formed on a second side portion thereof to a ground;
   the second cold cathode fluorescent lamp connects an electrode formed on a second side portion thereof to an inverter circuit on a second printed circuit board and connects an electrode formed on a first side portion thereof to a ground, and the inverter circuits formed on the first printed circuit board are configured such that the respective neighboring inverter circuits supply AC voltages having phases opposite to each other.

2. A liquid crystal display device according to claim 1, wherein the first cold cathode fluorescent lamp and the second cold cathode fluorescent lamp are alternately arranged.

3. A liquid crystal display device according to claim 1, wherein the first cold cathode fluorescent lamp and the second cold cathode fluorescent lamp are alternately arranged for every two other cold cathode fluorescent lamps.

* * * * *